United States Patent [19]
Schulz et al.

[11] 4,441,365
[45] Apr. 10, 1984

[54] SIGHT-GLASS MOUNTING

[75] Inventors: Wilhelm Schulz; Josef Kirchkamp, both of Krefeld, Fed. Rep. of Germany

[73] Assignee: Schulz & Co. KG, Krefeld, Fed. Rep. of Germany

[21] Appl. No.: 350,038

[22] Filed: Feb. 18, 1982

[30] Foreign Application Priority Data

Apr. 18, 1981 [DE] Fed. Rep. of Germany ....... 3115833

[51] Int. Cl.³ ............................................. G01F 23/02
[52] U.S. Cl. ..................... 73/331; 116/227; 350/319
[58] Field of Search ........................ 73/334, 331, 330; 116/276, 227; 220/82 R, 82 A; 350/319

[56] References Cited

U.S. PATENT DOCUMENTS 1,722,740 7/1929 Fulton .................................. 116/276
1,954,466 4/1934 Alcher ............................. 73/330 X

FOREIGN PATENT DOCUMENTS 1227678 10/1966 Fed. Rep. of Germany ........ 73/331

Primary Examiner—Gerald Goldberg
Assistant Examiner—Joseph W. Roskos
Attorney, Agent, or Firm—Michael L. Dunn

[57] ABSTRACT

A sight-glass mounting consists of a section of pipe having a flange at each end and openings provided on diametrically opposite sides are sealingly covered by glass discs. The openings are arranged off-center with respect to the axis of the section of pipe.

9 Claims, 6 Drawing Figures

SIGHT-GLASS MOUNTING

BACKGROUND OF THE INVENTION

Sight-glass mountings which are built into pipelines or onto containers before or after valves or slide gates, serve for the observation of the flowing medium as regards colour, consistency or degree of fouling. Known sight-glass mountings are produced by casting and exhibit a tubular section onto the open opposite ends of which first fixing flanges are cast in one piece or are welded on or fitted on. In the central section on diametrically opposite sides of the cylindrical shell, pipe stubs with second flanges are likewise cast on in one piece or welded on. The said first flanges serve for building the sight-glass mounting into the pipeline, and the said second flanges serve for the attachment of the glass discs which in general are attached in a removable manner by means of a flange ring with the interposition of sealing rings in order to be able to exchange them in case of damage or to clean them.

The production of the known sight-glass mounting by the dead-mould casting process is comparatively costly because for each size a special model must be manufactured and the casting must be effected singly. Since it is again always a question of different materials from which the sight-glass mountings must consist, that is, a material of the same kind as the pipeline into which it is to be built, a comparatively costly individual manufacture is necessary. Since the wall thickness of the cast products is furthermore comparatively great, the use of a greater amount of material is necessary. In addition to this the pipe stubs onto which the transparent discs are flanged, form dead spaces in which dirt is deposited, so that the view through the sight-glass with time becomes impaired.

In the German Offenlegungsschrift No. 29 33 939 a more economical manufacture of such sight-glass mountings is made possible by plain bearing areas for the glass discs being provided, which are moulded in one piece onto the section of pipe in the region round the openings. By this means dead spaces may be avoided, so that the view through the glass discs even after fairly long use of the mounting does not get impaired by deposited dirt.

In the case of this known sight-glass mounting a section of the pipeline into which the sight-glass mounting is to be built, may be employed for its production. This section then consists of the same material as the pipeline and therefore no problems result through the mating of different materials. It has less thickness of wall than a cast product, and hence demands less material and consequently is already cheaper. The formation of the bearing areas for the glass discs of the sight-glass mounting, in the region of the openings provided at diametrically opposite sides of the pipe shell, which are to be covered over by the discs to form a seal, may be effected in a manner which is very simple in manufacturing technique, by pressing, which reduces the costs of manufacture.

The object of this invention is to create a sight-glass mounting for building into pipelines running horizontally or onto horizontal outlets from containers, which is cheap to produce and in which no deposition of dirt can occur, which would cloud the view through the sight-glass mounting or make cleaning difficult. The diameter of the glass discs in that case is larger than the diameter of the section of pipe of the mounting.

DESCRIPTION OF THE INVENTION

According to the present invention a sight-glass mounting consists of a section of pipe in which openings provided on diametrically opposite sides are sealingly covered by glass discs in which the openings covered over by the glass discs are arranged off-centre with respect to the axis of the section of pipe. The off-centre arrangement of the glass discs with respect to the axis of the section of pipe of the sight-glass mounting is such that in the bottom part of the section of pipe no depression is formed as is usually the case with conventional sight-glass mountings with openings sealingly covered by glass discs the axis of which lie in the same plain with the axis of the pipe section of the mounting.

Because of the absence of a depression in the bottom part of the section of pipe of the sight-glass mounting in accordance with the invention, no deposition of dirt occurs. By that means the view through the sight-glass mounting remains unclouded even after fairly long use, and no problems of cleaning arise.

The production of the sight-glass mounting in accordance with the invention is cheap because either the openings which are to be covered over by glass-discs are necked out by cold-pressing from a section of pipe of the same material as the pipeline, that is, they are formed integrally with the pipe section.

In accordance with a preferred embodiment of the sight-glass mounting in accordance with the invention plane bearing areas for the glass discs are formed, lying as close as possible to the convex surface of the pipe. This firstly reduces the outer circumference of the sight-glass mounting and furthermore prevents the existence of dead spaces. The glass discs may be flanged in a simple manner onto the plane bearing areas with the interposition of a seal.

If in accordance with a further advantageous embodiment of the sight-glass mounting in accordance with the invention the glass disc is inserted in the opening with a slight clearance between an abutment shoulder and a snap ring and the circumferential gap is sealed by an inserted ring seal, under internal pressure in the sight-glass mounting the sealing is almost self-adjusting. I.e., the hand-work is avoided for careful uniform pulling up of flange fixing screws by means of torque wrenches, which is the prerequisite for a uniformly tight sealing of glass discs held by flanges. The slight clearance with which the glass disc is inserted between the abutments, guarantees building in free of stress and constantly uniform sealing round the circumference. It is further of particular advantage that screws and flanges for the attachment of the glass discs may be omitted. These additional parts which also claim a lot of room, thereby become superfluous. Hence besides the facilitation of the assembly an advantage in cost results through the elimination of components.

The glass disc may be fused into a metal ring which also may exhibit one or more grooves in the outer circumference for the insertion of ring seals. The life of the glass disc is hereby increased, because it does not burst so quickly. Furthermore the advantage results of better accessibility to the interior of the mounting in the case of cleaning and easier and quicker assembly in the case of exchange of the glass discs. It is only necessary to remove the snap ring, take out the glass disc, push in a new one or the cleaned disc again and to insert the snap ring. The glass disc with the metal ring is prepared beforehand complete with the sealing ring for building in. Since in the metal casing of the mounting no groove has to be provided for the sealing ring, it may consist of thinner material and is easier to manufacture.

BRIEF DESCRIPTION OF THE DRAWINGS

The accompanying drawings illustrate the invention the various figures being as follows.

DETAILED DESCRIPTION OF THE DRAWINGS

Figure 1:
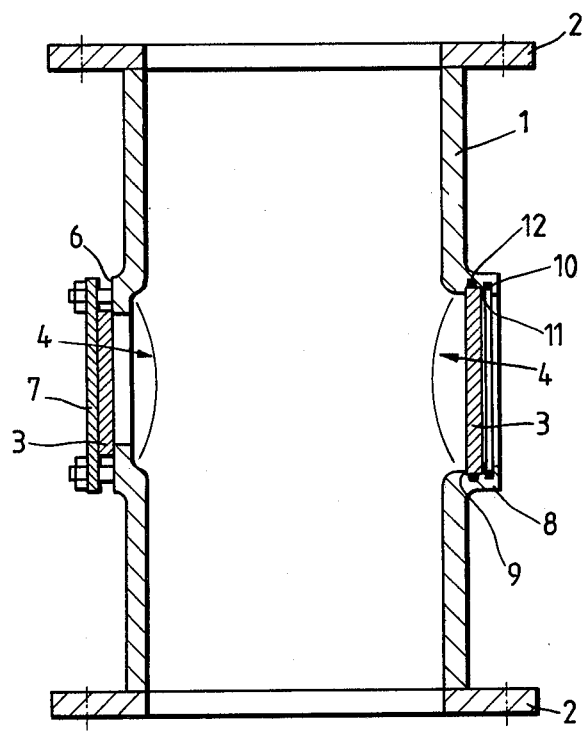
FIG. 1 shows a longitudinal section through one embodiment.

The sight-glass mounting consists of the section 1 of pipe onto the open opposite ends of which flanges 2 are moulded, welded or fitted. They serve for the fixing of the sight-glass mounting into horizontal pipelines (not shown) or onto the horizontal outlet from a container or a shut-off valve.

In the central part of the section 1 pipe openings 4 are provided on diametrically opposite sides, which allow the view of the medium flowing through the section 1 of pipe. As may best be seen from FIG. 2, these openings are arranged off-centre with respect to the axis of the section 1 of pipe, in such a way that in the bottom part of the section 1 of pipe no depression exists. The bottom edge of the glass disc 3 covering over the opening 4 lies approximately in one plane with the lowermost generatrix of the section 1 of pipe.

For the insertion of the glass discs into the sight-glass mounting various embodiments are shown in the drawing.

Figure 2:
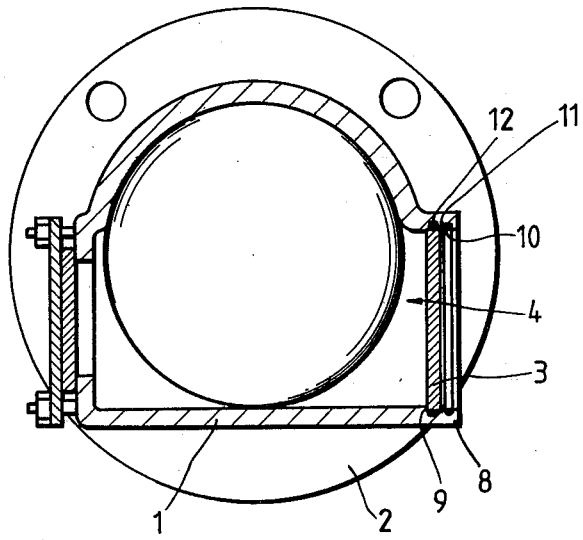
FIG. 2 the associated cross-section.
Figure 3:
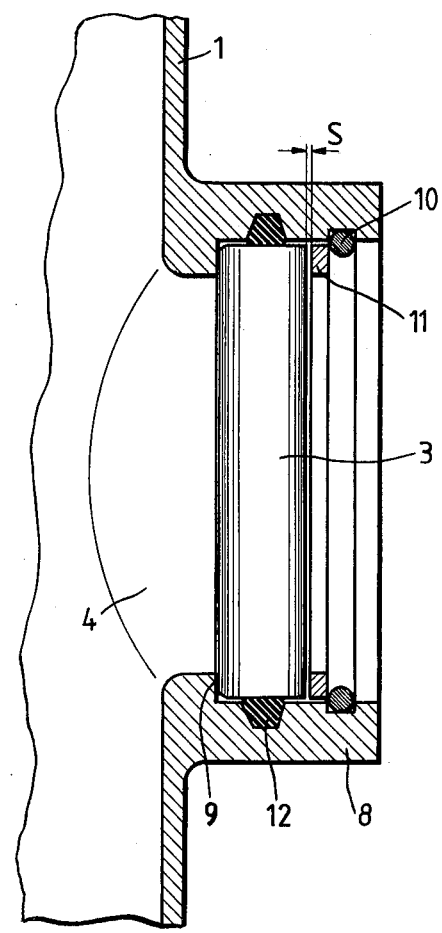
FIG. 3 shows on an enlarged scale and in section the sight opening formed in the righthand half of the mounting in accordance with FIG. 1.

In the case of the embodiment shown in the lefthand part of FIGS. 1 and 2 plane bearing areas 6 are moulded in one piece onto the section 1 of pipe by cold-pressing and the glass discs 3 are laid against them with the interposition of a seal and are fastened to the section 1 of pipe by means of a bolted flange ring 7, to cover over and seal the openings 4.

But in accordance with the righthand part of FIGS. 1 and 2 the glass discs 3 may also be inserted in a tubular neck 8 out from the section 1 of pipe. The neck 8 which may be formed by shaping in one piece by cold-pressing, exhibits an internal abutment shoulder 9, a circumferential groove in which a sealing ring 12 is laid and a further groove for the insertion of the snap ring 10 as the outer limit for the axial movement of the glass disc 3 which can move over the remaining distance s. Sealing is effected by means of the sealing ring 12 which fills the gap between the neck 8 and the circumferential face of the round glass disc 3 and is slightly compressed by the inserted glass disc 3.

Under an internal pressure the glass disc 3 is forced outwards by the amount s until in contact with the abutment ring 11 against which the glass disc 3 rests uniformly. The escape of medium is effectively prevented by the sealing ring 12.

Figure 4:
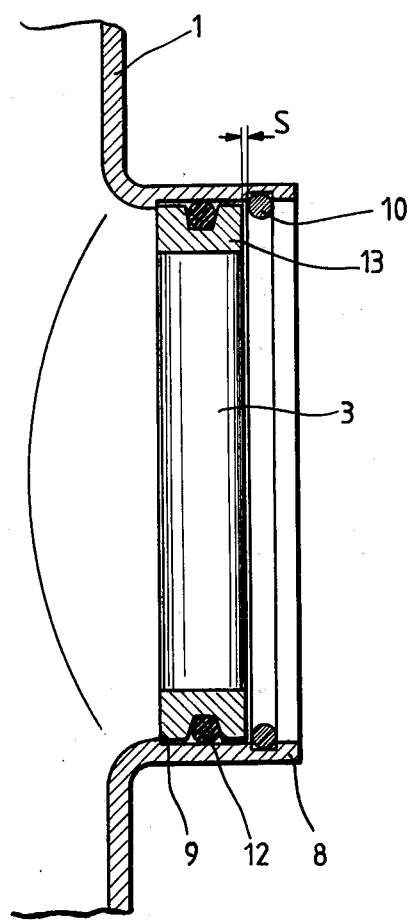
FIG. 4 is an embodiment modified with respect to FIG. 3.

In the case of the embodiment illustrated in FIG. 4 the glass disc 3 is fused into a metal ring 13. A groove is machined into the outer circumferential face of the metal ring 13, in which the sealing ring 12 is laid. Completed in this way, the glass disc is pushed into the tubular neck 8 and fixed by means of the snap ring 10. Upon insertion of the glass disc 3 into the neck 8 the sealing ring 12 gets slightly compressed and effectively seals the gap between the circumferential face of the metal ring and the neck 8.

Figure 5:
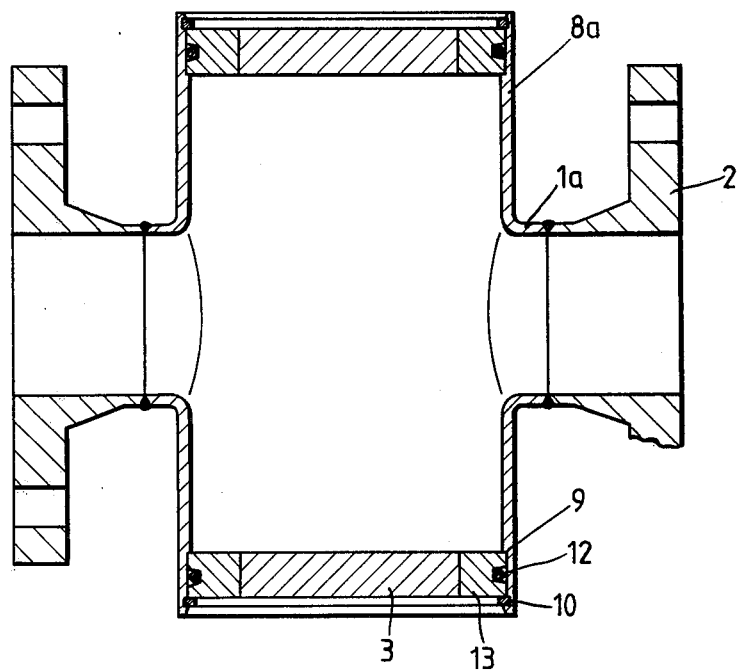
FIG. 5 is a longitudinal section.
Figure 6:
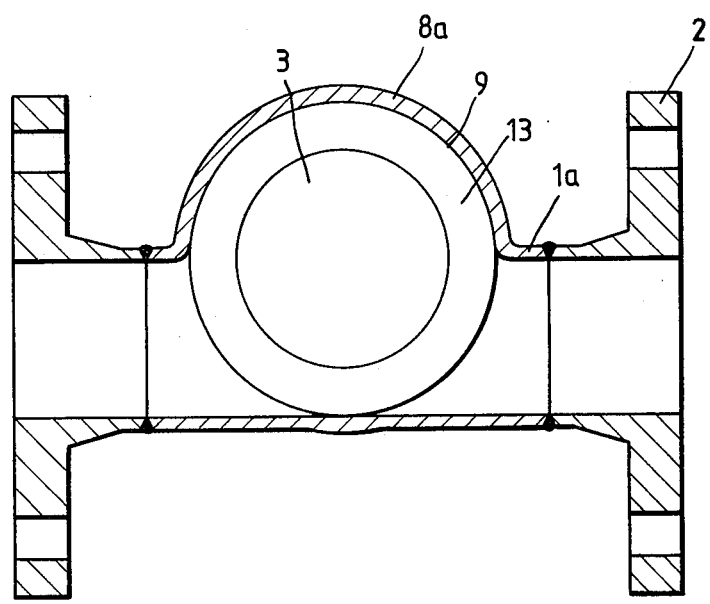
FIG. 6 is a cross-section of a further embodiment of the invention.

In the case of the embodiment of the sight-glass mounting in accordance with the invention, illustrated in FIGS. 5 and 6, the metallic casing of the mounting consists of a piece 8a of tube from the shell of which the pipe outlets 1a on opposite sides are shaped in one piece by cold-pressing and are provided with flanges for connection to the pipeline. The openings 4 at opposite sides of the piece 8a of tube are covered over by the glass discs 3 to form a seal in the same way as previously described. As regards the size of the inspection openings 4 this embodiment corresponds with the recommendations of the standards.

What is claimed is:

1. A sight-glass mounting comprising a section of pipe in which openings provided on diametrically opposite sides are sealingly covered by glass discs in which the openings covered over by the glass discs are arranged offset so far off-centre with respect to the axis of the section of pipe that a bulge necessary for the accommodation of the glass discs exists at only one side of the section of pipe.

2. The sight-glass mounting according to claim 1, in which plane bearing areas for the glass discs, around the openings, are formed in one piece out of the section of pipe.

3. The sight-glass mounting of claim 2, wherein the section of pipe has a convex surface and the plane bearing areas lie as close as possible to the convex surface of the section of pipe.

4. The sight-glass mounting according to claim 1, in which the glass discs have a circumferential face and are inserted with clearance into said openings, said openings having an internal surface provided with a groove into which is inserted a ring seal which seals the disc against the circumferential face.

5. The sight-glass mounting according to claim 4, in which the glass disc is fused into a metal ring in the outer circumferential face of which one or more grooves are provided for the insertion of sealing rings.

6. The sight-glass mounting of claim 4, in which the diameter of the openings is greater than the diameter of the section of pipe.

7. The sight-glass mounting of claim 6, in which from a piece of tube having the diameter of the openings, off-centre pipe outlets of smaller diameter are necked out on opposite sides by cold-pressing.

8. The sight-glass mounting according to claim 7, in which the glass discs are inserted with clearance and that the gap between the neck or respectively the piece of tube and the outer circumferential face of the glass disc is sealed by a ring seal inserted in a groove.

9. The sight-glass mounting according to claim 8, in which the glass disc is fused into a metal ring in the outer circumferential face of which one or more grooves are provided for the insertion of sealing rings.

* * * * *